United States Patent [19]

Fujimoto et al.

[11] 4,025,926

[45] May 24, 1977

[54] PHASE SYNCHRONIZATION FOR INK JET SYSTEM PRINTER

[75] Inventors: Isao Fujimoto, Kunitachi; Takeshi Kasubuchi; Masahiko Aiba, both of Nara, all of Japan

[73] Assignee: Sharp Kabushiki Kaisha, Osaka, Japan

[22] Filed: Mar. 28, 1975

[21] Appl. No.: 562,881

Related U.S. Application Data

[63] Continuation-in-part of Ser. No. 434,218, Jan. 17, 1974, abandoned.

[30] Foreign Application Priority Data

Apr. 25, 1974 Japan ................................ 49-7493

[52] U.S. Cl. ........................................ 346/1; 346/75

[51] Int. Cl.² ........................................ G01D 18/00

[58] Field of Search .................................. 346/75, 1

[56] References Cited

UNITED STATES PATENTS

| | | | |
|---|---|---|---|
| 3,596,276 | 7/1971 | Lovelady | 346/75 X |
| 3,750,191 | 7/1973 | Naylor | 346/75 |
| 3,769,630 | 10/1973 | Hill et al. | 346/75 |
| 3,769,632 | 10/1973 | Julisburger et al. | 346/75 |
| 3,866,237 | 2/1975 | Meier | 346/75 |

*Primary Examiner*—Joseph W. Hartary

*Attorney, Agent, or Firm*—Birch, Stewart, Kolasch & Birch

[57] ABSTRACT

In ink jet system printers of the charge amplitude controlling type, it is required, to ensure stable printing, that ink drop separation (drop formation) is timed to be in agreement with the application of charging signals. To this end, there are provided phase detecting signals having a period which is an integral multiple of the period of the exciting signals for the ultra-sonic vibrator attached to a jet nozzle, and which phase detecting signals are of opposite polarity to the charging signals. Moreover, in the printing operation, there are provided phase detecting ink drops which are charged by the phase detecting signals, in addition to printing ink drops. After the charge amplitude on the phase detecting drops is sensed, the phase detecting signals are controlled in a manner that the charge amplitude on the phase detecting drops takes the maximum value at all times. The phases of the charging signals are also controlled in a manner to enable the application thereof to the generated ink drops in the optimum phase relation.

7 Claims, 11 Drawing Figures

PHASE SYNCHRONIZATION FOR INK JET SYSTEM PRINTER

This application is a continuation-in-part of application Ser. No. 434,218, filed Jan. 17, 1974 for Phase Synchronization For Ink Jet System Printer, now abandoned.

BACKGROUND OF THE INVENTION

In an ink jet system printer, an ink stream emitted from a nozzle breaks into drops due to the Rayleigh's instability phenomenon. Although an exciting frequency of ultra-sonic vibration applied to the nozzle, and hence, to the stream of ink drops, is substantially identical with the drop separation frequency, the phase of drop separation or formation varies unsteadily. These variations will be caused by the blocking up of the nozzle due to foreign substances, temperature dependent characteristics of viscosity and surface tension of the ink and so forth, and in fact will be unavoidable. In an ink jet system printer of the charge amplitude controlling type wherein the ink drops charged with the charging signals are electrostatically deflected in accordance with the charge amplitude thereon as they pass through a high-voltage electric field thereby printing desired symbols such as alphabet characters, it is of importance that the application of the charging signals or the phase of the charging signals is timed to be in agreement with the drop separation phase. Such phase synchronization will exert a strong influence upon character formation and printing quality.

In the past, one approach to the phase synchronization has been proposed, wherein, when a printing head carrying the nozzle, charging electrode, etc., is returned to the left end or home position, the exciting signals for the ultra-sonic vibration and charging signals are both present in the optimum phase relation. However, this cannot follow variations in the drop separation phase which occur during a period of one-row printing, i.e., the period in which the printing head traverses the width of the record medium on which the printing is effected.

SUMMARY OF THE INVENTION

An object of the present invention is the provision of a new and novel phase synchronization technique for use in an ink jet system printer.

The above object of the invention is achieved by an arrangement wherein there are provided ink drops for the purpose of phase detection between characters or between those ink drops contributive to printing and then the phase detecting drops are charged with phase detecting signals. By sensing the charge amplitude on the phase detecting drops, the phase of drop separation is always detected when the printing head is travelling. Afterward, the charging signals are phase-compensated in accordance with irregularities in the drop formation to ensure stable printing. The synchronization technique of the invention is therefore applicable to the intermittent printing mode of a transmitting and receiving printer as well as to continuous printing modes.

DETAILED DESCRIPTION OF THE PREFERRED EMBODIMENTS

Figure 1:
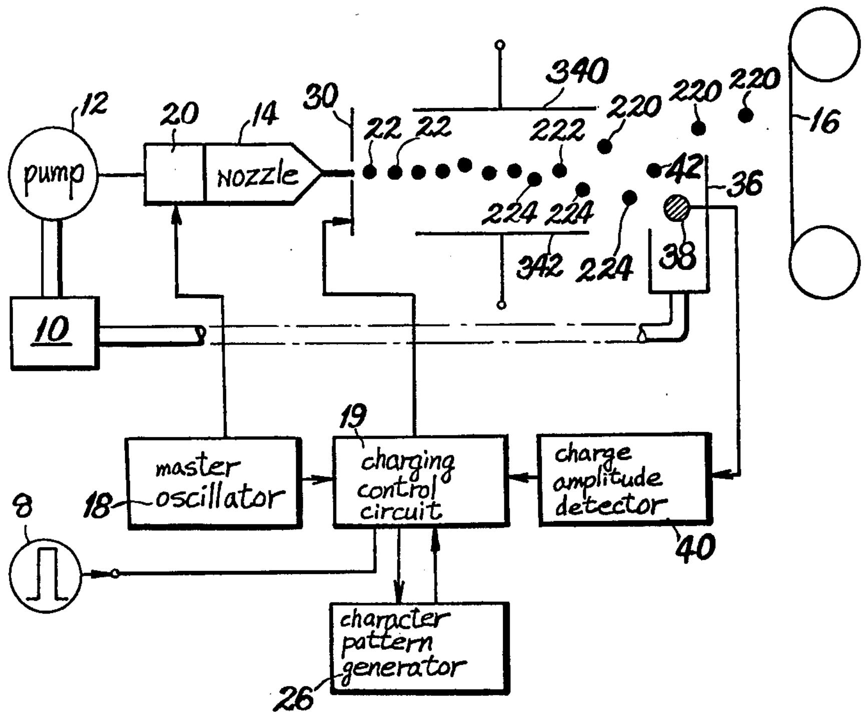
FIG. 1 is a block diagram showing a construction of an ink jet system printer in accordance with the present invention.

Generally, referring now to FIG. 1, in an ink jet system printer having a travelling printing head, a stream of ink is sent under pressure to a nozzle 14 by a pump 12 and excited by an ultrasonic vibrator 20 from a reservoir 10 so that ink drops 22 of a frequency equal to the exciting signal frequency are ejected from the nozzle 14. Excitation of the ultrasonic vibrator 20 is provided by a master oscillator circuit 18. The signals from the master oscillator circuit 18 are also applied to a charging control circuit 19 which in turn supplies charging signals corresponding to input signals 8 to a charging electrode 30 in cooperation with a character pattern generator 26. As the ink drops 220 charged with the charging signals pass over a high-voltage electric field established by a pair of high-voltage deflection plates 340, 342, they are deflected in accordance with the amplitude of charges on the drops and directed toward a recording paper 16. The ink drops 222 not contributive to writing operation are not charged and conducted to a beam gutter 36.

As previously described, it is required, in order to ensure stable writing operations, that the drop formation should be in phase synchronization with the application of the charging signals.

In accordance with the teachings of the present invention, in addition to the provision of the printing ink drops 220, 222, there are provided phase detecting 224, while the charging control circuit 19 provides phase detecting signals of the opposite polarity to the charging signals. The phase detecting signals are imposed on the charging electrode 30, thereby charging the phase detecting drops 224. As illustrated in FIG. 1, the phase detecting drops 224 may be interposed between the adjacent writing ink dots 220, 222 or between the adjacent groups of the writing ink dots. The relative positions of the phase detecting drops 224 will be described later in more detail together with the phase detecting signals, referring to FIGS. 2 through 9.

Since the phase detecting dots 224 charged with the phase detecting signals carry charges of the opposite polarity to the ink drops 220 charged with the charging signals, they are subject to reverse deflection in passing through the high-voltage deflection plates 340, 342. As a consequence, the phase detecting drops 224 fly in the wake illustrated in FIGS. 1 and 10. A phase detecting target 38 made of wire, or string electrode is provided at a position where the phase detecting drops 224 arrive. A charge amplitude detector 40 serves to sense the individual charge amplitudes on the phase detecting drops 224 and the phase synchronization between the charging signals and ink drop formation is performed depending upon the results of such determinations. Alternatively, a phase detecting electrode (not shown) may be provided to sense the passing of the above described phase detecting drops 224 by virtue of electrostatic induction.

The following is for three embodiments employing the invented phase synchronization technique.

Figure 2:
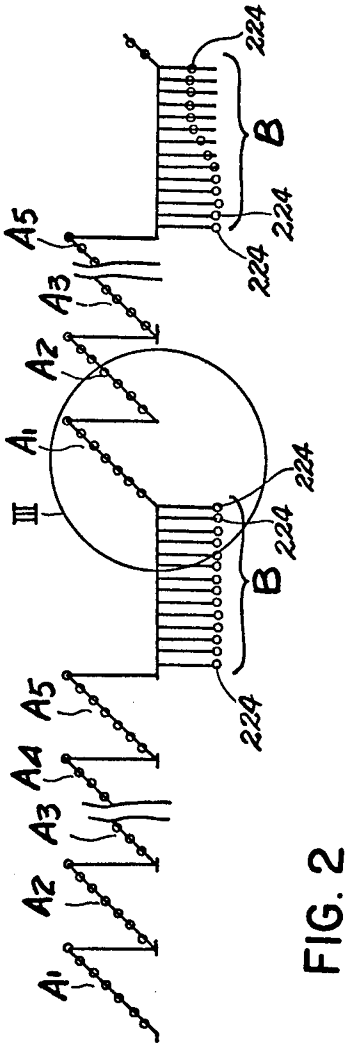
FIG. 2 is a time chart showing charging signals used in an embodiment of the present invention.

FIG. 2 illustrates waveforms of the charging signals used in an example wherein the phase detecting drops 224 are deposited between adjacent groups of the ink drops 220 for writing each character.

In the illustrated embodiments, each character is printed in a matrix, for example, 7 rows × 5 columns, to write characters. The adjacent characters are spaced away by, for example, 7 rows × 2 columns. Furthermore, 14 ink drops deposited in the spacing are applied as the phase detecting drops as briefly described. As shown in FIG. 2 A1, A2, A3, A4 and A5 represent charging signals for printing the first, second, third, fourth and fifth columns of the drop matrix respectively. B represents the phase detecting signals, or 14 pulse signals corresponding to the occurrence of the 14 phase detecting drops 224.

Figure 3:
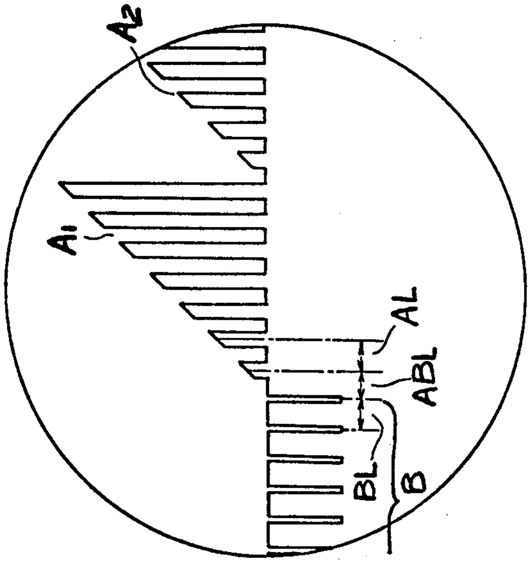
FIG. 3 is a partially enlarged time chart of FIG. 2.

The individual charging signals A1-A5 each consist of seven pulses, as illustrated in FIG. 3. In FIG. 2 the circular marked signals correspond to the ink drops, the horizontal axis shows ink drop generation periods and the vertical axis charge voltage. The phase detecting signals B should be of short pulse duration effective to detection and of such amplitude that the phase detecting drops 224 charged in the optimum phase relation strike precisely on the target 38 (see FIGS. 1 and 10). Errors in charge phase will result in a reduction in the charge amplitude and hence, the outputs from the charge amplitude detector 40.

Figure 4:
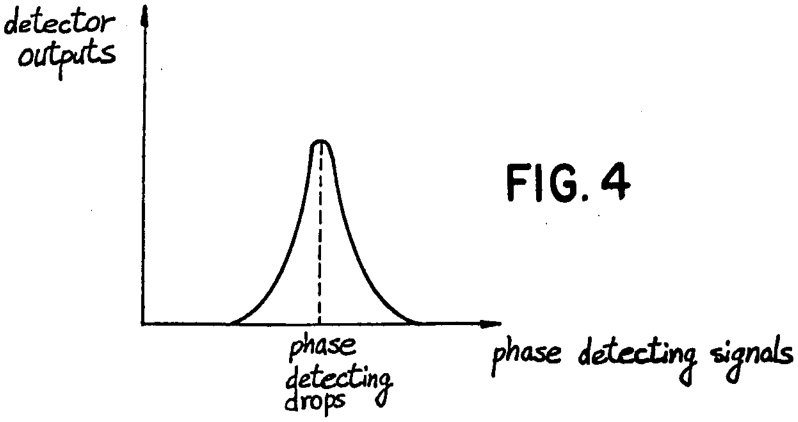
FIG. 4 is a waveform chart for purposes of explaining a charge amplitude on ink drops.

Reference is now made to FIG. 4, which illustrates the detector outputs which vary depending upon the relation between the phase detecting drops and phase detecting signals B. The phase detecting signals B are phase-controlled in a manner to increase the detector outputs to the maximum value thereof. By properly controlling the phase of the phase detecting signals B in this way, it becomes possible to adjust the charging signals A in the optimum phase relation. That is, referring to FIGS. 2 and 3, the spacing $AB_L$ between the last pulse within the phase detecting signals B and the center of the first appearing pulse within the charging signals A should be equal to the pulse spacing $B_L$ of the phase detecting signals B to satisfy the above requirements. Because the phase detecting signals B and the charging signals are both controlled by the master oscillator 18, the spaces $B_L$ and AL (see FIG. 3) are identical.

Figure 5:
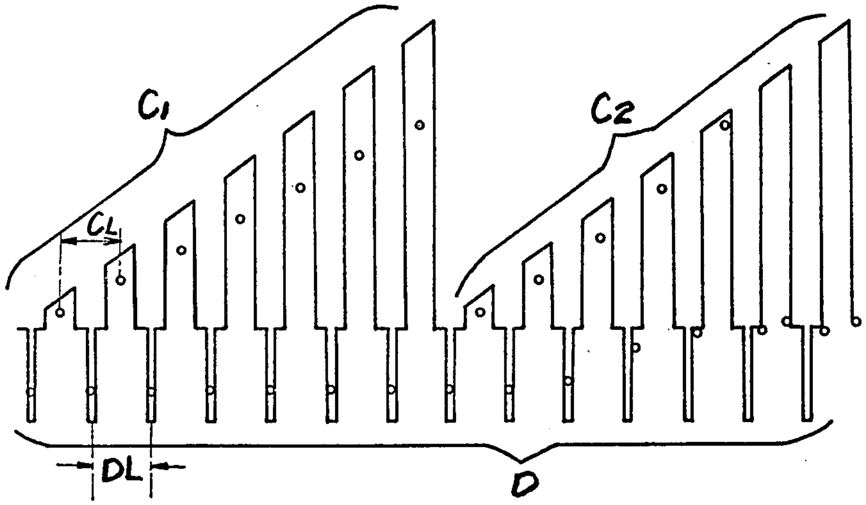
FIG. 5 is a time chart showing charging signals used in another embodiment of the present invention.
Figure 6:
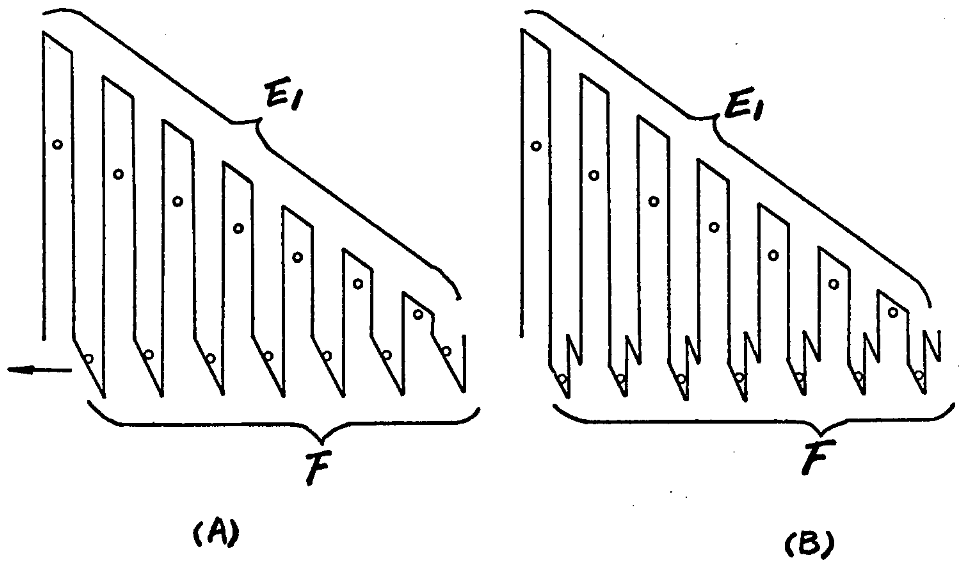
FIGS. 6(A) and 6(B) are time charts showing charging signals used in still another embodiment of the present invention.

Reference is now made to FIG. 5 which illustrates an embodiment wherein the phase detecting drops and the writing drops are alternatively provided thereby responding to any turbulence in the drop formation phase occurring during a period of one-character printing process.

In this charging signal format, $C_1$ and C 2 represent the charging signals for writing the first and second columns of the drop matrix, respectively. The charging signals $C_1$-C5 are provided to define the five respective columns of one character in the same way as the FIG. 2 embodiment. Similarly, the individual charging signals are constituted by seven pulses and the pulse period CL is twice longer than the ink drop formation period. Moreover, the phase detecting signals D are of twice the drop formation period and of sequentially variable phase. In the same manner as the FIG. 2 embodiment, the phase detecting signals D are so phase-controlled that the charge amplitude due to the phase detecting signals D takes the maximum value. The charging signals $C_1$-C5 are controlled in a manner to center on the center of low level of the phase detecting signals D during the non-charging period.

FIGS. 6(A) and 6(B) illustrate still another embodiment where the phase detecting drops and the writing drops are alternatively provided and, in addition, the phase detecting signals are of saw-tooth waveform.

Figure 7:
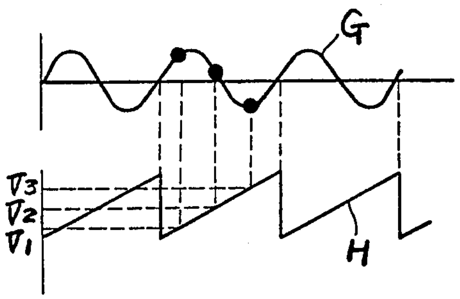
FIGS. 7 through 9 are waveform charts for purposes of explaining a method of sensing charge amplitude by saw-tooth signals.
Figure 8:
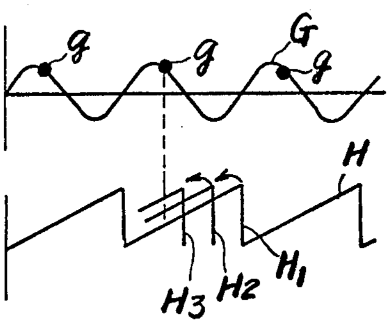
Figure 9:
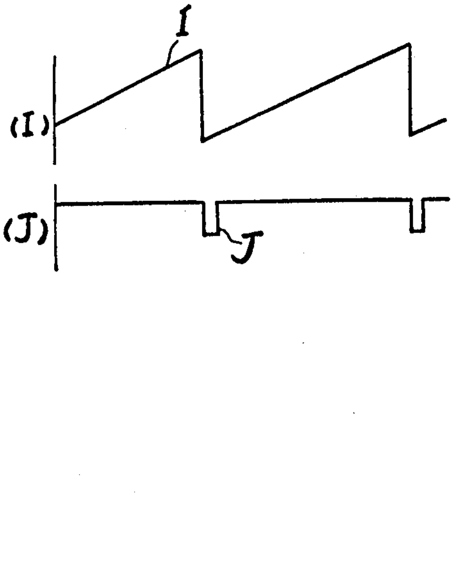

The modes of charge amplitude detections by means of the saw-tooth signals may be understood by reference to FIGS. 7 through 9. If the saw-tooth signals H, for purpose of charging, are of the identical frequency as the exciting signals G to the charging electrode 30 as shown in FIG. 7, the individual ink drops will be charged to the voltages $V_1$, V2, V3, in accordance with the individual drop formation phases. In the case where the charging saw-tooth signals H are phase-controlled in the order of $H_1$, H2, H3, the charge amplitudes on the ink drop groups appearing at the point g in the exciting signals G vary in response to the variations in phase of the charging saw-tooth signals H. By converting such variations in the charge amplitudes into counterparts in the voltage with the use of the phase-detecting target 38 and the charge amplitude detector 40, there are provided signals of saw-tooth voltage waveform I as illustrated in FIG. 9. It will be noted that the period of the voltage waveform I is dominated by the rate of variations of the phase of the charging sawtooth signals H. As a consequence of differentiation of the voltage waveform I, the pulse signals J as illustrated in FIG. 9, are obtainable. Such pulse signals J occur when the drop formation is timed in agreement with the trailing edges of the charging signals H of saw-tooth waveform.

In FIGS. 6(A) and 6(B), $E_1$ represent the charging signals for writing the first column of the drop matrix while F represents the phase detecting signals. The phase detecting signals F are phase-controlled in the same manner and the pulse signals J are produced when the drop formation is absolutely synchronous with the trailing edges of the phase detecting signals F. The charging signals $E_1$-E5 are controlled in such a way that the trailing edge of the phase detecting signals F is positioned at the center of the non-charging period of the charging signals $E_1$-E5 as described in FIG. 6(B), whereby ensuring charging operations in the optimum phase relation.

Figure 10:
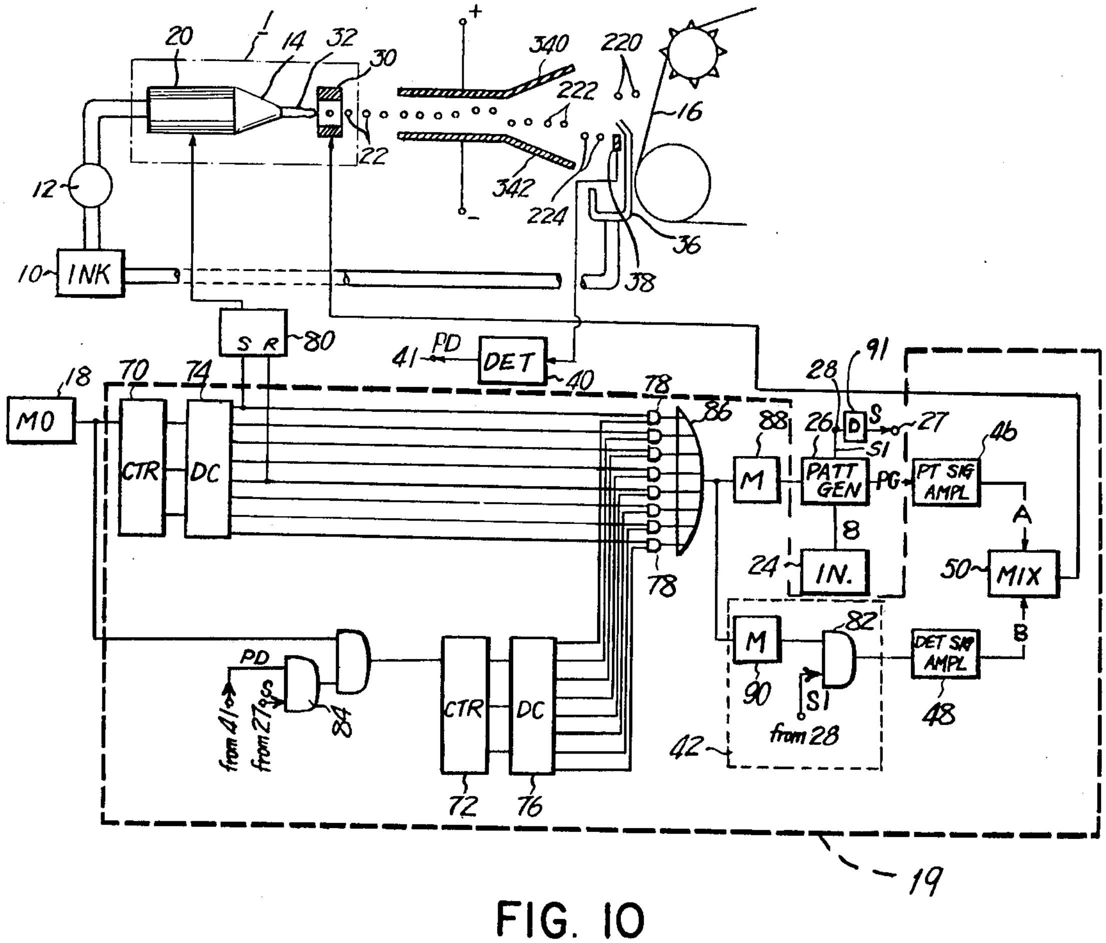
FIG. 10 is a more detailed schematic of the phase synchronization circuit of FIG. 1.

Reference is now made to FIG. 10 which illustrates a more detailed schematic circuit diagram of a circuit arrangement embodying the present invention. As shown, a large-amplitude amplifier 46 amplifying the character voltage level and of the erasing voltage level is connected to the output of the character pattern generator circuit 26. Another large-amplitude amplifier 48 amplifying the phase detecting voltage level is connected to the output of the phase detecting signal generator circuit 42. A mixer circuit 50, receives outputs A and B, and delivers its output to the charging electrode 30.

In the various embodiments of the invention, as shown in FIG. 10, all circuit components such as the electromechanical transducer 20 the character pattern generator circuit 26 and phase detecting signal generator 42 are synchronized by the master oscillator 18 and its associated circuitry at a frequency of one-eigth that of the master oscillator 18.

To facilitate a more complete understanding of the present invention, the phase synchronizing method will now be described in more detail with respect to the synchronization format of FIGS. 2 and 3, to which joint reference is made with FIG. 10.

A first decoder 74 connected to a first counter 70 of radix "8" sequentially supplies eight terminals thereof with timing signals, the phase of the timing signals differing from each other and each of the timing signals having the frequency of one eigth of that of the master oscillator 18. The electromechanical transducer 20 mounted on the nozzle 14 is excited by outputs from an RS flip-flop 80, the latter being driven by the first decoder 74 and the frequency of the resulting exciting signals being one eigth of that of the master oscillator 18. An output terminal 41 of the charge amplitude detector circuit 40 provides a low level signal PD when the ink drops 224 are charged by the phase detecting signals B, and a high level signal PD when the ink drops 224 charged with the phase detecting signals B do not reach the detection electrode 38. In other words, the output signals of the terminal 41 are at high level when the ink drops are charged by the charging pulse train PG and the resulting charging signals A at the output of the mixer 50 generated from the character pattern generator circuit 26 or the ink drops 224 are not charged by the said phase detecting signal B, even though the phase detecting signal generator circuit 42 generates the said phase detecting signals. The character pattern generator circuit 26 provides a high level signal S1 at an output terminal 28 thereof when the charging pulse train PG is not generated. The output signals S1 at the terminal 28 are low level when the charging pulse train PG is generated from the character pattern generator circuit 26.

In order to synchronize output signals S with the output signals PD from the terminals 27 and 41, respectively, a delay circuit 91 is provided between the pattern generator 26 and its output terminal 27. With the time delay of the delay circuit 91 chosen to correspond to the time period required to propel an ink drop from the charging electrode 30 to the phase detecting target 38, such synchronization is accomplished.

The output terminal 28 is connected to an input terminal of an AND gate 82 within the phase detecting signal generator circuit 42 in order to prevent the phase detecting signal B from being generated when the charging pulse train PG is generated. The output signals S and PD from the output terminals 27 and 41, respectively, are introduced to an AND gate 84. A second counter 72 of radix 8 performs the operation of counting up in synchronization with the output signals from the master oscillator 18 when the charging pulse train PG is not generated and the ink drops 224 are not charged with the phase detecting signals B even though the said phase detecting signals are generated. That is, the second counter 72 counts up the contents thereof when the drop formation phase is not synchronized with the phase of the charging signals. Output signals from the second counter 72 are decoded by a second decoder 76 and the output signals of the second decoder 76 are introduced to respective ones of the AND gate 78. Output signals of an OR gate 86 driven by the AND gates 78 are of the phase which corresponds to the contents of the second counter 72. The second counter 72 performs the counting operation during the period when the drop formation phase is not synchronized with the phase of the charging signals and holds the contents thereof when the synchronization is performed. Therefore, the phase of the timing signal which is introduced to the character pattern generator circuit 26 and the phase detecting signal generator circuit 42 will be changed till the phase synchronization is performed and the synchronized phase relationship is maintained automatically. In the drawing, the reference number 88 represents a one-shot multivibrator operating with a period of four times that of the exciting signals from the master oscillator 18, and 90 represents a one-shot multivibrator operating with a period of 1.5 times that of the exciting signals from the master oscillator 18. These multivibrators determine the period of the charging pulses A and the phase detecting signals B, respectively.

In the event that the drop formation phase is synchronized with the phase of the charging signals, i.e., when the phase detecting signals PD are at a low level, the AND gate 84 will not be enabled and consequently, the second counter 72 will no longer charge its contents. In this case, the second counter 72 and its contents are maintained in a static mode and the output signals thereof are applied through the second decoder circuit 76 to the respectively associated input terminals of the AND gates 78.

The OR gate 86 is thus enabled once for any one of eight pulses from the master oscillator 18 (via first decoder circuit 74) which correspond to the contents of the said second counter 72, without further regard to the condition of the AND gate 84.

In ink jet system printers, the character pattern generators such as the generator 26 of the present invention usually include a matrix counter of, for example, radix "49". The signals representative of the counts 1 – 35 are used for generating the charging pulse train PG and the signals representative of the counts 36 – 49 are used for generating the signal S. In other words, the signals 1 – 35 correspond to a character matrix pattern of 7 rows by 5 columns, whereas the signals 30 –49 correspond to the space between adjacent characters, namely, a matrix of 7 rows by 2 columns.

Thus, in order to accomplish an alternation of printing or writing ink drops with phase detecting ink drops such as illustrated in the format of FIG. 5, a flip-flop is employed at the input side of such a matrix counter of radix "49" within the pattern generator 26 such that the set output signals of the flip-flop are the input signals for the matrix counter and the reset output signals of the flip-flop are used for generating the output signals S1, as will now be apparent to one of ordinary skill in the art.

While the foregoing description of the details and operation of the embodiment of FIG. 10 are described with reference to the synchronization format of FIGS. 2 and 3, it is to be understood that changes in the counting and decoding logic of FIG. 10 which would be apparent to one of ordinary skill in the art can be made to adapt the synchronization formats of FIGS. 5–9 to the circuit of FIG. 10.

We claim:

1. In an ink jet system printer of the charge amplitude controlling type wherein a stream of ink drops are generated by exciting signals of a predetermined frequency propelled towards a printing medium at said predetermined frequency and various charge amplitudes are applied to selected ones of said ink drops by a charging electrode to effect the printing of characters on said printing medium, the method of applying said charge amplitudes in optimum phase synchronization with said ink drops comprising the steps of:

selectively applying printing charging signals of a first polarity to said ink drops;

applying phase detecting charging pulse signals of a predetermined maximum charge amplitude to selected alternate ones of said ink drops of a polarity opposite to said printing signals and sequentially varying the phase of said pulse signals;

sensing the occurrence of said predetermined maximum charge amplitude on said selected alternate ones of said ink drops as an indication of phase synchronization; and sequentially varying the phase of said printing charging signals to subsequent ink drops in the absence of the occurrence of said indication of phase synchronization;

said printing charging signals being provided with a period which is an integral multiple of that of the exciting signals generating said ink drops; and said phase detecting pulse signals being provided with the same period as the said charging signals.

2. In an ink jet system printer of the charge amplitude controlling type wherein a stream of ink drops are generated by exciting signals of a predetermined frequency propelled towards a printing medium at said predetermined frequency and various charge amplitudes are applied to selected ones of said ink drops by a charging electrode to effect the printing of characters on said printing medium, the method of applying said charge amplitudes in optimum phase synchronization with said ink drops comprising the steps of:

selectively applying printing charging signals of a first polarity to said ink drops;

applying phase detecting charging pulse signals of a predetermined maximum charge amplitude to selected alternate ones of said ink drops of a polarity opposite to said printing signals and sequentially varying the phase of said pulse signals;

sensing the occurrence of said predetermined maximum charge amplitude on said selected alternate ones of said ink drops as an indication of phase synchronization; and sequentially varying the phase of said printing charging signals to subsequent ink drops in the absence of the occurrence of said indication of phase synchronization;

said selected alternate ones of said ink drops comprising the sequence of ink drops between each group of drops utilized to generate a character to be printed.

3. The method of claim 2, wherein the said printing charging signals are provided with a period which is an integral multiple of that of the exciting signals generating said ink drops; and wherein the said phase detecting pulse signals are provided with the same period as the said charging signals.

4. In an ink jet system printer of the charge amplitude controlling type wherein a stream of ink drops are generated by exciting signals of a predetermined frequency propelled towards a printing medium at said predetermined frequency and various charge amplitudes are applied to selected ones of said ink drops by a charging electrode to effect the printing of characters on said printing medium, the method of applying said charge amplitudes in optimum phase synchronization with said ink drops comprising the steps of:

selectively applying printing charging signals of a first polarity to said ink drops;

applying phase detecting charging pulse signals of substantially rectangular waveform and of a predetermined maximum charge amplitude to selected alternate ones of said ink drops as determined by the absence of said printing charging signals and of a polarity opposite to said printing signals;

sensing the occurrence of said predetermined maximum charge amplitude on said selected alternate ones of said ink drops as an indication of phase synchronization;

sequentially varying the phase of said phase detecting charging pulse signals to subsequent ink drops in the absence of the occurrence of said indication of phase synchronization; and varying the phase of said printing charging signals in accordance with the variation of phase of the phase detecting charging pulse signals.

5. The method of claim 4, wherein the said printing charging signals are provided with a period which is an integral multiple of that of the exciting signals generating said ink drops; and wherein the said phase detecting pulse signals are provided with the same period as the said charging signals.

6. The method of claim 5, wherein said selected alternate ones of said ink drops comprise the sequence of ink drops between each group of drops utilized to generate a character to be printed.

7. The method of claim 6, wherein the said printing charging signals are provided with a period which is an integral multiple of that of the exciting signals generating said ink drops; and wherein the said phase detecting pulse signals are provided with the same period as the same charging signals.

Reconsideration and allowance are requested.

* * * * *

UNITED STATES PATENT AND TRADEMARK OFFICE

CERTIFICATE OF CORRECTION

PATENT NO. : 4,025,926

DATED : May 24, 1977

INVENTOR(S) : Isao FUJIMOTO et al

It is certified that error appears in the above-identified patent and that said Letters Patent are hereby corrected as shown below:

UNDER THE HEADING

"[30] Foreign Application Priority Data", change "Apr. 25, 1974 Japan.......49-7493" to read as follows:

-- Jan. 17, 1973 Japan.....48-7493 --

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,025,926

DATED : May 24, 1977

INVENTOR(S) : Isao FUJIMOTO et al

It is certified that error appears in the above-identified patent and that said Letters Patent are hereby corrected as shown below:

IN THE HEADING OF THE PATENT:

"[73] Assignee:"

In the list of Assignees, after "Japan" insert --Nippon Telegraph and Telephone Public Corporation, Tokyo, Japan--.

Signed and Sealed this

*Twenty-second* Day of *August 1978*

[SEAL]

*Attest:*

RUTH C. MASON
*Attesting Officer*

DONALD W. BANNER
*Commissioner of Patents and Trademarks*